United States Patent [19]
Cox et al.

[11] Patent Number: 6,007,856
[45] Date of Patent: Dec. 28, 1999

[54] OIL-IN-WATER DISPERSIONS OF β-CAROTENE AND OTHER CAROTENOIDS STABLE AGAINST OXIDATION PREPARED FROM WATER-DISPERSIBLE BEADLETS HAVING HIGH CONCENTRATIONS OF CAROTENOID

[75] Inventors: Donald Joseph Cox, Hamilton; Donald Raymond Kearney, Cincinnati; Sanford Theodore Kirksey, Jr., Cincinnati; Matthew Joel Taylor, Cincinnati, all of Ohio

[73] Assignee: The Procter & Gamble Company, Cincinnati, Ohio

[21] Appl. No.: 08/908,845

[22] Filed: Aug. 8, 1997

[51] Int. Cl.$^6$ .................................................. A23L 1/054
[52] U.S. Cl. ...................... 426/250; 426/330.3; 426/599; 426/540; 426/590; 426/654
[58] Field of Search ............................... 426/250, 330.3, 426/540, 597, 599, 590, 654; 585/351, 833; 424/455, 492; 514/938; 428/402.2; 252/311

[56] References Cited

U.S. PATENT DOCUMENTS

| | | | |
|---|---|---|---|
| 2,661,349 | 12/1953 | Caldwell et al. | 260/224 |
| 2,702,262 | 2/1955 | Bavley | 167/81 |
| 2,861,891 | 11/1958 | Bauernfeind et al. | 99/148 |
| 3,316,101 | 4/1967 | Borenstein et al. | 99/148 |
| 3,455,838 | 7/1969 | Marotta et al. | 252/316 |
| 3,655,406 | 4/1972 | Klaui | 424/64 |
| 3,790,688 | 2/1974 | Walter, Jr. et al. | 426/380 |
| 3,886,294 | 5/1975 | Emodi et al. | 426/540 |
| 3,962,416 | 6/1976 | Sol Katzen | 424/19 |
| 3,962,463 | 6/1976 | Witzel | 426/5 |
| 3,998,753 | 12/1976 | Antoshkiw et al. | 252/312 |
| 4,096,281 | 6/1978 | Young et al. | 426/89 |
| 4,285,981 | 8/1981 | Todd, Jr. et al. | 426/250 |
| 4,316,917 | 2/1982 | Antoshkiw et al. | 426/540 |
| 4,323,587 | 4/1982 | Basa et al. | 426/540 |
| 4,385,076 | 5/1983 | Crosby | 426/533 |
| 4,435,427 | 3/1984 | Hoppe et al. | 424/356 |
| 4,460,617 | 7/1984 | Barndt et al. | 426/609 |
| 4,522,743 | 6/1985 | Horn et al. | 252/311 |
| 4,668,439 | 5/1987 | Billenstein et al. | 260/410.9 |
| 4,670,247 | 6/1987 | Scialpi | 424/484 |
| 4,699,664 | 10/1987 | Hettiakachy et al. | 106/288 |
| 4,705,691 | 11/1987 | Kupper et al. | 426/590 |
| 4,726,955 | 2/1988 | Horn et al. | 426/73 |
| 4,788,068 | 11/1988 | Konishi et al. | 426/116 |
| 4,822,534 | 4/1989 | Lencki et al. | 264/4.3 |
| 4,844,934 | 7/1989 | Lueddecke et al. | 426/540 |
| 4,929,774 | 5/1990 | Fukamachi et al. | 568/824 |
| 4,946,701 | 8/1990 | Tsai et al. | 426/597 |
| 4,992,282 | 2/1991 | Mehansho et al. | 426/72 |
| 5,002,779 | 3/1991 | Mehansho et al. | 426/72 |
| 5,023,095 | 6/1991 | Kirk | 426/250 |
| 5,079,016 | 1/1992 | Tood, Jr. | 426/250 |
| 5,153,012 | 10/1992 | Ohtaka et al. | 426/72 |
| 5,190,775 | 3/1993 | Klose | 426/2 |
| 5,215,757 | 6/1993 | El-Nokaly | 424/488 |
| 5,221,735 | 6/1993 | Leuenberger et al. | 536/4.1 |
| 5,258,194 | 11/1993 | Anderson et al. | 426/540 |
| 5,350,773 | 9/1994 | Schweikert et al. | 514/763 |
| 5,356,636 | 10/1994 | Schneider et al. | 424/489 |
| 5,364,563 | 11/1994 | Cathrein et al. | 252/311 |
| 5,424,082 | 6/1995 | Dake et al. | 426/72 |
| 5,427,806 | 6/1995 | Ekanayake et al. | 426/330.3 |
| 5,460,823 | 10/1995 | Jensen et al. | 424/451 |
| 5,478,569 | 12/1995 | Berneis et al. | 424/456 |
| 5,516,535 | 5/1996 | Heckert et al. | 426/2 |
| 5,605,699 | 2/1997 | Bernhard | 424/442 |
| 5,616,358 | 4/1997 | Taylor et al. | 426/590 |
| 5,641,532 | 6/1997 | Pflaumer et al. | 426/590 |
| 5,670,548 | 9/1997 | Bernhard et al. | 514/725 |
| 5,780,086 | 7/1998 | Kirksey | 426/546 |
| 5,792,502 | 9/1998 | Montezinos | 426/590 |

FOREIGN PATENT DOCUMENTS

| | | | |
|---|---|---|---|
| 1079218A | 12/1993 | China | C07C 403/24 |
| 59-095867 | 6/1984 | Japan . | |
| 6-172170 | 6/1994 | Japan . | |
| 7-067574 | 3/1995 | Japan | A23L 1/27 |
| 08120187 | 5/1996 | Japan | C09B 61/00 |
| 8-119933 | 5/1996 | Japan | C07C 403/24 |
| WO 95/24832 | 9/1995 | WIPO | A61K 35/78 |
| WO 96/40262 | 12/1996 | WIPO | A61K 47/48 |
| WO 97/15554 | 5/1997 | WIPO | C07C 403/24 |

OTHER PUBLICATIONS

Industrial Production of Lycopene by a Microbiological Method; A. S. Gavrilov, et al.; Applied Chemistry and Microbiology; vol. 32, No. 5, 1996—pp. 492–494.

Droplet Composition Affects the Rate of Oxidation of Emulsified Ethyl Linoleate; J.N. Coupland; JAOCS, vol. 73, No. 6 (1996).

Stability of Spray–Dried Encapsulated Carrot Carotenes; Lori A. Wagner, et al.; Journal of Food Science; vol. 60, No. 5, 1995.

*Primary Examiner*—Cynthia L. Nessler
*Attorney, Agent, or Firm*—James F. McBride; Karen F. Clark; Jacobus C. Rasser

[57] ABSTRACT

Oil-in-water dispersions of β-carotene and other carotenoids that are stable against oxidation, even in the presence of polyphosphates, especially sodium hexametaphosphate. These oil-in-water dispersions are typically prepared by contacting a water-dispersible beadlet comprising at least about 5% colloidal carotenoid with the water phase to form droplets of the carotenoid that are in intimate contact with sufficient oil phase such that the carotenoid is stable against oxidation, even in the absence of an effective antioxidant such as ascorbic acid. The oil-in-water carotenoid dispersions of the present invention are especially useful in dilute juice beverages for providing vitamin A fortification and color, as well as other oil/water food and beverage products where vitamin A fortification and/or color are desired.

18 Claims, No Drawings

൬,൦൦൭,൮൫൬

OIL-IN-WATER DISPERSIONS OF β-CAROTENE AND OTHER CAROTENOIDS STABLE AGAINST OXIDATION PREPARED FROM WATER-DISPERSIBLE BEADLETS HAVING HIGH CONCENTRATIONS OF CAROTENOID

TECHNICAL FIELD

This application relates to oil-in-water dispersions of β-carotene and other carotenoids that are stable against oxidation and are prepared from water-dispersible beadlets comprising higher concentrations of colloidal β-carotene. This application especially relates to the use of such β-carotene dispersions as colorants and/or for vitamin A fortification in dilute juice beverages that contain polyphosphates, and in particular sodium hexametaphosphate.

BACKGROUND OF THE INVENTION

A particularly useful source of coloring agents for a variety of foods and beverages are the carotenoids. The carotenoids include carotene, lycopene, bixin, zeaxanthin, cryptoxanthin, lutein, canthaxanthin, β-apo-8'-carotenal, β-apo-12'-carotenal and can provide color pigments ranging from yellow to red. An especially important member of the carotenoid class of compounds is β-carotene. β-carotene is not only useful as a colorant (typically yellow, orange and especially red in color) but also provides a valuable source of vitamin A. For this reason, β-carotene is often included in foods and beverages as a colorant, especially where vitamin A fortification is needed or desired.

One particular food system that β-carotene has been included in for both vitamin A fortification and color are dilute juice beverages. Dilute juice beverages often have a cloudy or opaque appearance by incorporating a beverage emulsion. These beverage emulsions can be either flavor emulsions (i.e., provide the beverage with flavor and cloudiness) or cloud emulsions (i.e., provide primarily cloudiness). Both types of beverage emulsions comprise an oil phase that is dispersed in a continuous water phase, i.e., they are "oil-in-water" emulsions. This oil phase is typically uniformly dispersed in the continuous water phase in the form of fine droplets that give the beverage its cloudy or opaque appearance.

Dilute juice beverages that are intended to be stored without refrigeration (e.g., at ambient temperatures), pasteurization or aseptic packing typically need an antimicrobial preservative. Dilute juice beverages, when exposed to food spoilage microorganisms, can provide a hospitable environment for rapid microbial growth. Such exposure can result from accidental contamination of the dilute juice beverage during manufacturing or packaging. Food spoilage microorganisms can then rapidly proliferate by feeding on nutrients provided by various components (e.g., the juice itself) of the dilute juice beverage.

Preservatives, such as sorbates, benzoates, organic acids, and combinations thereof have been used in dilute juice beverages to provide some degree of microbial inhibition. At levels effective to inhibit microbial growth, some of these preservatives can contribute off-flavors to dilute juice beverages. Accordingly, it has been recently suggested to include certain food grade polyphosphates (especially sodium hexametaphosphate) to enhance the potency of these preservatives at lower levels in dilute juice beverages. See U.S. Pat. No. 5,431,940 (Calderas), issued Jul. 11, 1995, which discloses the use of polyphosphates, such as sodium hexametaphosphate, in combination with sorbate preservatives, such as potassium sorbate, in dilute juice beverages having relatively low water hardness.

Adding β-carotene to dilute juice beverages so that it is well dispersed, as well as providing vitamin A activity and desirable color, has been found not to be an easy proposition. The carotenoids, including β-carotene, are relatively insoluble in water and have relatively high melting points. They are also highly sensitive to oxidation, especially in the presence of water. To make it more water-dispersible, β-carotene is often formulated as a water-dispersible beadlet. These beadlets can be made by dissolving β-carotene in a water-miscible organic solvent, mixing the dissolved β-carotene with an aqueous solution of a swellable colloid (typically gelatin), precipitating the β-carotene in a colloidally dispersed form and then drying the colloidal dispersion. See, for example, U.S. Pat. No. 3,316,101 (Borenstein), issued Apr. 25, 1967 and U.S. Pat. No. 4,522, 743 (Horn et al), issued Jun. 11, 1985. See also D. Horn, "Preparation and Characterization of Microdisperse Bioavailable Carotenoid Hydrosols," Die Angewandte Makromolekulare Chemie 166/167, (1989), 139–153; H. T. Gordon and J. C. Bauernfeind, "Carotenoids as Food Colorants," CRC Critical Reviews in Food Science and Nutrition, 18, (1982), 59–97; H. Klaui and J. C. Bauernfeind, "Carotenoids as Food Colorants," Carotenoids as Colorants and Vitamin A Precursors, Chapter 2, (1981).

Even when added as a water-dispersible beadlet, it has been found that β-carotene can still be very sensitive to oxidation in dilute juice beverages that contain sodium hexametaphosphate such that vitamin A activity is rapidly lost and color changes over time, especially when the beverage is subjected to light stress. This has particularly been found to happen when the dilute juice beverage is formulated by dispersing the β-carotene beadlets in water, and then blending this dispersion with the other dilute juice beverage ingredients such as sodium hexametaphosphate. The inclusion of antioxidants such as ascorbic acid has been suggested as a way to prevent the oxidation β-carotene. See U.S. Pat. No. 3,886,294 (Emodi et al), issued May 27, 1975 (use of ascorbic acid as antioxidant for carotenoid coloring compositions); and U.S. Pat. No. 5,153,012 (Ohtaka et al), issued Oct. 6, 1992 (use of a mixture of vitamins C, $B_2$ and E to stabilize β-carotene even under ambient conditions to minimize its loss from the beverage.) However, even when an antioxidant such as ascorbic acid is included, it has still been found that the β-carotene is rapidly oxidized in dilute juice beverages that contain sodium hexametaphosphate such that vitamin A activity is lost and color changes over time.

The concentration of β-carotene in the water-dispersible beadlet has also been found to be important to the oxidative stability of the β-carotene when formulated in dilute juice beverages that contain sodium hexametaphosphate. For example, when the water-dispersible beadlets contain about 10% β-carotene, it has been found that vitamin A activity and color is rapidly lost over time in such dilute juice beverages containing sodium hexametaphosphate. By contrast, when water-dispersible powders containing only about 1% or 2.5% β-carotene are used, vitamin A activity and color is maintained over time in such dilute juice beverages, even when sodium hexametaphosphate is present. Unfortunately, to provide equivalent vitamin A activity and color, significantly more of these 1% or 2.5% β-carotene powders would need to be included in the dilute juice beverage which increases the processing cost, the ingredient cost, and complexity in formulating the beverage.

Furthermore, these 1% or 2.5% β-carotene powders are generally not as physically stable (i.e., they cream more readily) compared to the 10% β-carotene beadlets.

Accordingly, it would be desirable to be able to formulate dilute juice beverages that (1) can be formulated with water-dispersible beadlets containing high concentrations of β-carotene; (2) provide adequate vitamin A activity and color over the expected storage and use life of the beverage; (3) allow the use of preservative systems that contain polyphosphates, especially sodium hexametaphosphate.

DISCLOSURE OF THE INVENTION

The present invention relates to oil-in-water dispersions of β-carotene and other carotenoids that are stable against oxidation, even in the presence of polyphosphates, especially sodium hexametaphosphate. These oil-in-water dispersions are prepared from a water-dispersible beadlet comprising at least about 5% colloidal carotenoid where the carotenoid is released from the beadlet and is in intimate contact with sufficient oil phase such that the carotenoid is stabilized against oxidation when in the presence of the water phase, even in the absence of an effective antioxidant such as ascorbic acid. The oil-in-water carotenoid dispersions of the present invention are especially useful in dilute juice beverages for providing vitamin A fortification and color. However, these oil-in-water dispersions can also be used in other oil/water food and beverage products where vitamin A fortification and/or color are desired, such as salad dressings, margarines, infant formulas, frostings and icings for cakes and the like, tomato-based sauces, processed cheese foods, baked mix batters, egg replacers, snack foods, and the like.

DETAILED DESCRIPTION OF THE INVENTION

A. Definitions

As used herein, the term "oil-in-water dispersion" refers to all systems where the oil phase is the dispersed phase and the water phase is the continuous phase and includes the term "oil-in-water emulsion."

As used herein, the term "comprising" means that the various components, or steps, can be conjointly employed in practicing the present invention. Accordingly, the term "comprising" encompasses the more restrictive terms "consisting essentially of" and "consisting of."

All weights, parts, ratios and percentages used herein are based on weight unless otherwise specified.

B. Water-Dispersible Carotenoid Beadlets

The oil-in-water dispersions according to the present invention are prepared by using water-dispersible beadlets comprising a carotenoid. Suitable carotenoids for use in the present invention include the known natural or synthetic available representatives of this class such as carotene, lycopene, bixin, zeaxanthin, cryptoxanthin, lutein, canthaxanthin, β-apo-8'-carotenal, -apo-12'-carotenal, β-apo-8'-carotenoic acid, and esters of hydroxy- or carboxy-containing members of this group, such as the lower alkyl esters (e.g., methyl and ethyl esters). These carotenoids can be employed singly or as combinations of carotenoids. Especially preferred is β-carotene because it provides a source of vitamin A in addition to color.

The water-dispersible beadlets comprising the carotenoid that are suitable for use in the present invention can prepared by a variety of methods known to the art. See, for example, U.S. Pat. No. 3,316,101 (Borenstein), issued Apr. 25, 1967; U.S. Pat. No. 4,522,743 (Horn et al), issued Jun. 11, 1985; U.S. Pat. No. 4,670,247 (Scialpi), issued Jun. 2, 1987; U.S. Pat. No. 4,726,955 (Horn et al), issued Feb. 23; all of which are incorporated by reference, for suitable methods for obtaining water-dispersible beadlets comprising carotenoids, especially β-carotene. Typically, the carotenoid is dissolved in a water-miscible organic solvent (or dissolved in oil with heating), mixed with an aqueous solution of a swellable colloid (typically gelatin), precipitated in a colloidally dispersed form and then dried to form a colloidal dispersion or beadlet. Accordingly, the term "beadlets" will be used to refer to all such forms of dried colloidal carotenoid dispersions.

Water-dispersible beadlets suitable for use in the present invention also comprise a relatively high concentration of the carotenoid, i.e., at least about 5% carotenoid, and usually in the range of from about 5 to about 20%. More typically, the water-dispersible beadlets comprise from about 8 to about 15% carotenoid. For water-dispersible beadlets comprising β-carotene that are preferred for use in the present invention, the level of β-carotene is typically in the range of from about 10 to about 12%. Suitable water-dispersible beadlets for use in the present invention that comprise such high concentrations of β-carotene are Roche 10% CWS β-carotene distributed by Roche Vitamins and Fine Chemicals, Nutley, N.J. and BASF Lucarotin 10% CWD β-carotene distributed by BASF, Mount Olive, N.J.

C. Preparing Oil-in-Water Carotenoid Dispersions

The key aspect of the present invention is to form an oil-in-water dispersion from the water-dispersible beadlets comprising the β-carotene or other carotenoid. In forming this oil-in-water dispersion, the colloidal carotenoid initially needs to be released from the water-dispersible beadlet. A variety of methods are suitable for releasing the carotenoid from the beadlet. For example, the beadlets can be dissolved or dispersed in a polar solvent such as water, propylene glycol, glycerol or ethanol. The carotenoid can also be released by grinding up the beadlets or by subjecting the beadlets to high shear mixing. The preferred method for releasing the carotenoid from the beadlets is by contacting them with the aqueous phase of the dispersion (e.g., adding the beadlets to water or an aqueous solution of ingredients) to form droplets of the carotenoid dispersed in the aqueous phase.

Unfortunately, once the colloidal carotenoid is released from the beadlet, it is more susceptible to oxidation, especially when in the presence of the aqueous phase of the dispersion, and particularly when exposed to light and heat. To stabilize the carotenoid against such oxidation, it is important that the released colloidal carotenoid ultimately be in intimate contact with the oil phase. Because β-carotene and other carotenoids are more oil soluble than water soluble, it is believed that the carotenoid becomes miscible with this oil phase such that a protective coating, barrier, or droplet of oil is formed around the carotenoid and/or there is a change in the crystallinity of the carotenoid. This oil coating, barrier, or droplet and/or change in crystallinity prevents the carotenoid from being oxidized by other components, including oxygen, which might be present in the aqueous phase, even in the absence of an effective antioxidant such as ascorbic acid.

The ability to form oil-in-water dispersions of β-carotene or other carotenoids that are stable against oxidation according to the present invention is dependent upon a number of factors. One is the ratio of the oil phase to the carotenoid. Higher ratios of oil phase to carotenoid are preferred in formulating oil-in-water dispersions where the carotenoid is stable against oxidation. Typically, the ratio of oil phase to carotenoid is at least about 10:1, and preferably at least about 500:1 (e.g., in a beverage emulsion).

Another factor is the degree of energy input that is imparted during formation of the oil-in-water dispersion so as to cause intimate contact between the oil phase and the carotenoid. Simple mixing can be sufficient to cause contact between the carotenoid and the oil phase. However, systems that impart high shear in formation of the oil-in-water dispersion (e.g., homogenization) are typically preferred for causing intimate contact between the carotenoid and oil phase. Suitable homogenizers for forming oil-in-water dispersions according to the present invention include Gaulin homogenizers, Microfluidizers, Rainey homogenizers and the like.

Another factor is the type of oil that is in intimate contact with the released carotenoid, and especially the solubility of the carotenoid in the oil. For example, vegetable oils such as soybean oil, canola oil, cottonseed oil, sunflower oil, corn oil, safflower oil, rapeseed oil, as well as mixtures of these oils, are suitable for use in the present invention. However, oils in which the carotenoid is more soluble are especially preferred, such as citrus oils (e.g., orange oil) in the case of $\beta$-carotene. Mixtures of vegetable and citrus oils can also be used.

When an emulsion stabilizer (e.g., a modified starch) is used in the dispersion (e.g., beverage emulsions), other factors that are important in insuring that the carotenoid is stable against oxidation are: (1) the ratio of stabilizer to oil phase; and (2) the temperature at which the emulsion is formed. Lower ratios of stabilizer to oil phase are typically preferred in formulating oil-in-water emulsions that insure the carotenoid is stable against oxidation. For example, in case of modified starches, the ratio of stabilizer to oil phase is typically in the range of from about 0.1:1 to about 5:1, preferably from about 0.4:1 to about 2:1, most preferably from about 0.6:1 to about 1.5:1. Higher temperatures are also typically preferred in formulating oil-in-water emulsions that insure the carotenoid is stable against oxidation. Typically, the emulsion is formulated at a temperature of at least about 40° F. (4.4° C.), preferably at least about 70° F. (21.1° C.), most preferably at least about 100° F. (37.8° C.).

The particular order in which the water-dispersible beadlet comprising the $\beta$-carotene or other carotenoid, water phase and oil phase are combined together is not critical so long the colloidal carotenoid is released from the beadlet and is in intimate contact with the oil phase when in the presence of the aqueous phase. For example, the beadlets comprising the carotenoid can be initially dispersed in the oil phase and then combined with the water phase. The beadlets comprising the carotenoid can also be initially dissolved or dispersed in a mixture that comprises a polar solvent such as water, propylene glycol, glycerol, ethanol, or mixtures thereof, and the oil phase. The beadlets comprising the carotenoid can be ground up or subjected to high shear mixing after being combined with the water and/or oil phase to facilitate the formation of droplets of carotenoid that are in intimate contact with the oil phase and to facilitate the formation of a more chemically stable oil- in-water emulsion of the carotenoid. The preferred method according to the present invention typically involves adding the beadlets comprising the carotenoid to a mixture comprising both the water and oil phase ingredients and then homogenizing this mixture to form the oil-in-water dispersion of carotenoid.

Suitable methods for preparing oil-in-water dispersions of carotenoids according to the present invention can be particularly understood from the following description of the preparation of beverage emulsions containing $\beta$-carotene that are especially useful in providing vitamin A fortification and color in dilute juice beverages. However, it should be understood that suitable oil-in-water dispersions of $\beta$-carotene that are stable against oxidation can also be formulated, for example, by incorporation of the $\beta$-carotene beadlets into beverage flavor premixes that contain an oil phase, using appropriate modifications of this method. In addition, besides dilute juice beverages, these oil-in-water dispersions of $\beta$-carotene can be incorporated into other beverages, as well as other food systems such as salad dressings, margarines, infant formulas, frostings and icings for cakes and the like, tomato-based sauces, processed cheese foods, baked mix batters, egg replacers, snack foods, and the like, where vitamin A fortification and/or color is needed or desired.

Beverage emulsions comprising $\beta$-carotene according to the present invention that are stable against oxidation can be in the form of either cloud emulsions or flavor emulsions. Cloud emulsions comprise fats or oils that act as the clouding agent and also provide the oil phase for protecting the $\beta$-carotene against oxidation. Any of a variety of food-grade fats or oils suitable as clouding agents can be employed. Preferred are those fats and oils that have been refined, bleached and deodorized to remove off-flavors. Especially suitable for use as clouding agents are those fats and oils that are organoleptically neutral. These include fats and oils from the following sources: vegetable oils such as soybean, corn, safflower, sunflower, cottonseed, canola, and rapeseed; nut fats such as coconut, palm, and palm kernel; and synthetic fats. See U.S. Pat. No. 4,705,691 (Kupper, et al), issued Nov. 10, 1987 (herein incorporated by reference) for suitable fat or oil clouding agents. The particular ratio of fat/oil to $\beta$-carotene in the cloud emulsion that provides stability against oxidation depends upon the level of cloud and the degree of fortification/color desired in the beverage. Typically, cloud emulsions that provide stability against oxidation for $\beta$-carotene have a ratio of fat/oil to $\beta$-carotene of at least about 100:1, preferably at least about 200:1, and most preferably at least about 500:1.

An emulsion stabilizer is typically included in the cloud emulsion to keep it physically stabilized as an oil-in-water emulsion. Any suitable food grade emulsifier that can stabilize fat or oil clouding agents as an oil-in-water emulsion can be used. Suitable emulsifiers include gum acacia, modified food starches (e.g., alkenylsuccinate modified food starches), anionic polymers derived from cellulose (e.g., carboxymethylcellulose), gum ghatti, modified gum ghatti, xanthan gum, tragacanth gum, guar gum, locust bean gum, pectin, and mixtures thereof. See U.S. Pat. No. 4,705,691 (Kupper, et al), issued Nov. 10, 1987, which is incorporated by reference. Modified starches treated so they contain hydrophobic as well as hydrophilic groups, such as those described in U.S. Pat. No. 2,661,349 (Caldwell et al) (herein incorporated by reference), are preferred emulsion stabilizers for use herein. Octenyl succinate (OCS) modified starches such as those described in U.S. Pat. No. 3,455,838 (Marotta et al.), and U.S. Pat. No. 4,460,617 (Barndt et al.), (herein incorporated by reference), are especially preferred emulsion stabilizers.

The fat or oil clouding agent can be combined with a weighting agent to provide a beverage emulsion that does not separate out and rise to the top of the beverage. Typical weighting oils include brominated vegetable oil, glycerol ester of wood rosin (ester gum), sucrose acetate isobutyrate (SAIB) and other sucrose esters, gum damar, colophony, gum elemi, or others known to those skilled in the art. Other suitable weighting agents include brominated liquid polyol polyesters that are nondigestible. See U.S. Pat. No. 4,705,690 (Brand et al), issued Nov. 10, 1987, which is incorporated by reference.

The cloud emulsions of the present invention are typically prepared by mixing together water, other optional ingredients such as ascorbic acid and other acidulants such a citric acid, the emulsion stabilizer, the fat or oil clouding agent, optionally the weighting agent, and finally the β-carotene as a water-dispersible beadlet. The emulsion typically contains from about 0.1 to about 25% fat or oil clouding agent (oil phase), from 0 to about 20% weighting oil agent, from about 1 to about 30% emulsion stabilizer, from about 0.01 to about 0.5% β-carotene, and from about 25 to about 97.9% water. Preferably, the emulsion contains from about 5 to about 15% fat or oil clouding agent, from about 2 to about 20% emulsion stabilizer, from about 0.02 to about 0.1 β-carotene, and from about 60 to about 80% water.

To improve the physical stability of the cloud emulsion, the particle size is typically reduced by passing the emulsion mixture through an homogenizer, colloid mill or turbine-type agitator. Besides improving physical stability, passing the emulsion mixture through such high shear devices promotes intimate contact between the β-carotene and the oil phase, and thus improves the stability of the β-carotene against oxidation. Usually one pass through such high shear devices is sufficient, although additional passes are typically used to reduce particle size and improve physical stability. See U.S. Pat. No. 4,705,691 (Kupper, et al), issued Nov. 10, 1987, which is incorporated by reference. A particularly preferred way for physically stabilizing cloud emulsions according to the present invention that do not use weighting oils is disclosed in U.S. Pat. No. 5,616,358 (Taylor et al), issued Apr. 1, 1997, which is incorporated by reference. These preferred cloud emulsions have a relatively small mean droplet particle size (from about 0.10 to about 0.30 microns) and use modified food starch (preferably octenyl succinate modified starches) as the emulsion stabilizer at a ratio of the stabilizer to oil phase of at least about 0.5:1.

Flavor emulsions according to the present invention are similar to cloud emulsions in terms of composition and preparation but additionally comprise (at a level of from about 0.001 to about 20%) one or more suitable flavor oils, extracts, oleoresins, essential oils and the like, known in the art for use as flavorants in beverages. Flavor emulsions can also comprise flavor concentrates such as those derived from concentration of natural products such as fruits. Terpeneless citrus oils and essences can also be used herein. Examples of suitable flavors include fruit flavors such as orange, lemon, lime and the like, cola flavors, tea flavors, coffee flavors, chocolate flavors, dairy flavors, and others. These flavors can be derived from natural sources such as essential oils and extracts, or can be synthetically prepared. The flavor emulsion typically comprises a blend of various flavors and can be employed in the form of an emulsion, alcoholic extract, or spray dried. The flavor emulsion can also include clouding agents, with or without weighting agents, as previously described. See U.S. Pat. No. 4,705,691 (Kupper, et al), issued Nov. 10, 1987, which is incorporated by reference.

D. β-Carotene-Containing Beverage Emulsions in Dilute Juice Beverages

The β-carotene-containing beverage emulsions of the present invention are particularly useful in the dilute juice beverages. The particular level of beverage emulsion according to the present invention incorporated into these dilute juice beverages depends upon a number of factors, and especially the level of cloud and vitamin fortification/color desired in the finished beverage. Dilute juice beverages of the present invention typically comprise from about 0.2 to about 5%, preferably from about 0.5 to about 3%, most preferably from about 0.8 to about 2%, of these beverage emulsions. These beverage emulsions can be either a cloud emulsion or a flavor emulsion as previously described.

The dilute juice beverages of the present invention optionally but preferably comprise flavor solids selected from fruit juice, tea solids and mixtures of fruit juice and tea solids. When fruit juice is included, the beverages of the present invention can comprise from 0.1 to about 40%, preferably from 1 to about 20%, more preferably from about 2 to about 10%, most preferably from about 3 to about 6%, fruit juice. (As measured herein, the weight percentage of fruit juice is based on a single strength 2° to 16° Brix fruit juice.) The fruit juice can be incorporated into the beverage as a puree, comminute or as a single strength or concentrated juice. Especially preferred is the incorporation of the fruit juice as a concentrate with a solids content (primarily as sugar solids) of from about 20° to about 80° Brix.

The fruit juice can be any citrus juice, non-citrus juice, or mixture thereof, which are known for use in dilute juice beverages. The juice can be derived from apple, cranberry, pear, peach, plum, apricot, nectarine, grape, cherry, currant, raspberry, gooseberry, elderberry, blackberry, blueberry, strawberry, lemon, lime, mandarin, orange, grapefruit, cupuacu, potato, tomato, lettuce, celery, spinach, cabbage, watercress, dandelion, rhubarb, carrot, beet, cucumber, pineapple, coconut, pomegranate, kiwi, mango, papaya, banana, watermelon, tangerine and cantaloupe. Preferred juices are derived from apple, pear, lemon, lime, mandarin, grapefruit, cranberry, orange, strawberry, tangerine, grape, kiwi, pineapple, passion fruit, mango, guava, raspberry and cherry. Citrus juices, preferably grapefruit, orange, lemon, lime, and mandarin juices, as well as juices derived from mango, apple, passion fruit and guava, as well as mixtures of these juices are most preferred.

When tea solids are included, the beverages of the present invention can comprise from bout 0.01 to about 1.2%, preferably from about 0.05 to about 0.8%, by weight of tea solids. The term "tea solids" as used herein means solids extracted from tea materials including those materials obtained from the genus Camellia including *C. sinensis* and *C. assainica,* for instance, freshly gathered tea leaves, fresh green tea leaves that are dried immediately after gathering, fresh green tea leaves that have been heat treated before drying to inactivate any enzymes present, unfermented tea, instant green tea and partially fermented tea leaves. Green tea materials are tea leaves, tea plant stems and other plant materials that are related and which have not undergone substantial fermentation to create black teas. Members of the genus Phyllanthus, *catechu gawbir* and Uncaria family of tea plants can also be used. Mixtures of unfermented and partially fermented teas can be used.

Tea solids for use in beverages of the present invention can be obtained by known and conventional tea solid extraction methods. A particularly preferred source of green tea solids can be obtained by the method described in copending U.S. patent application Ser. No. 08/606,907 (Ekanayake et al), filed Feb. 26, 1996, which is incorporated by reference. Tea solids so obtained will typically comprise caffeine, theobromine, proteins, amino acids, minerals and carbohydrates. Suitable beverages containing tea solids can be formulated according to U.S. Pat. No. 4,946,701 (Tsai et al), issued Aug. 7, 1990, which is incorporated by reference. See also U.S. Pat. No. 5,427,806 (Ekanayake et al) issued Jun. 26, 1995, for a suitable sources of green tea solids for use in the present invention.

Dilute juice beverages according to the present invention can comprise thickeners, including xanthan gum, carboxymethylcellulose, propylene glycol alginate, gellan gum, guar gum, pectin, tragacanth gum, locust bean gum, as well as mixtures of these thickeners. These thickeners are typically included in the beverages of the present invention at levels up to about 0.25%, depending on the particular thickener involved and the viscosity effects desired.

The dilute juice beverages of the present invention can, and typically will, contain an effective amount of one or more sweeteners, including carbohydrate sweeteners and natural and/or artificial no/low calorie sweeteners. The amount of the sweetener used (i.e., "effective amount") in the beverages of the present invention typically depends upon the particular sweetener used and the sweetness intensity desired. For no/low calorie sweeteners, this amount varies depending upon the sweetness intensity of the particular sweetener.

The dilute juice beverages of the present invention can be sweetened with any of the carbohydrate sweeteners, preferably mono- and or di-saccharide sugars. Sugar sweetened beverages will typically comprise from about 0.1 to about 20%, most preferably from about 6 to about 14%, sugar. These sugars can be incorporated into the beverages in solid or liquid form but are typically, and preferably, incorporated as a syrup, most preferably as a concentrated syrup such as high fructose corn syrup. For purposes of preparing beverages of the present invention, these sugar sweeteners can be provided to some extent by other components of the beverage such as the fruit juice component, flavorants, and so forth.

Preferred sugar sweeteners for use in these beverages are sucrose, fructose, glucose, and mixtures thereof. Fructose can be obtained or provided as liquid fructose, high fructose corn syrup, dry fructose or fructose syrup, but is preferably provided as high fructose corn syrup. High fructose corn syrup (HFCS) is commercially available as HFCS-42, HFCS-55 and HFCS-90, which comprise 42%, 55% and 90%, respectively, by weight of the sugar solids therein as fructose. Other naturally occurring sweeteners or their purified extracts, such as glycyrrhizin, the protein sweetener thaumatin, the juice of Luo Han Guo disclosed in, for example, U.S. Pat. No. 5,433,965 (Fischer et al), issued Jul. 18, 1995 (herein incorporated by reference), and the like can also be used in the beverages of the present invention.

Suitable no/low calorie sweeteners include saccharin, cyclamates, acesulfam K (Sunete™), L-aspartyl-L-phenylalanine lower alkyl ester sweeteners (e.g., aspartame); L-aspartyl-D-alanine amides disclosed in U.S. Pat. No. 4,411,925 to Brennan et al.; L-aspartyl-D-serine amides disclosed in U.S. Pat. No. 4,399,163 to Brennan et al.; L-aspartyl-L-1-hydroxymethylalkaneamide sweeteners disclosed in U.S. Pat. No. 4,338,346 to Brand; L-aspartyl-1-hydroxyethyalkaneamide sweeteners disclosed in U.S. Pat. No. 4,423,029 to Rizzi; and L-aspartyl-D-phenylglycine ester and amide sweeteners disclosed in European Patent Application 168,112 to J. M. Janusz, published Jan. 15, 1986.; and the like and mixtures thereof. A particularly preferred low calorie sweetener is aspartame.

Components in the dilute juice beverage, such as fruit juice, can provide a hospitable environment for rapid microbial growth, especially when stored at ambient temperatures. This necessitates the inclusion of a preservative system to prevent or retard such microbial growth. Accordingly, the beverages of the present invention comprise from about 100 to about 1000 ppm, preferably from about 200 to about 1000 ppm, and most preferably from about 200 ppm to about 750 ppm, of a preservative selected from sorbic acid, benzoic acid, alkali metal salts thereof and mixtures thereof. The preservative is preferably selected from sorbic acid, potassium sorbate, sodium sorbate and mixtures thereof. Most preferred is potassium sorbate.

The dilute beverages of the present invention further preferably comprise an amount of a food grade water soluble polyphosphate that is effective to enhance the antimicrobial potency of the preservative. What constitutes an "effective amount" of the polyphosphate to enhance the antimicrobial potency of the preservative will depend on a number of factors, including the specific preservative used, the level at which the preservative is present in the beverage, the pH of the beverage, and the level of hardness present in the beverage. It is believed that the polyphosphate enhances the antimicrobial potency of the preservative by sequestering the hardness (i.e., calcium and magnesium ions) present in the beverage. This causes the microbes present in the beverage to lose calcium and magnesium and thus interferes with their ability to protect themselves from the antimicrobial effect of the preservative. Inclusion of the polyphosphate in beverage at levels of from about 300 to about 3000 ppm, preferably from about 900 to about 3000 ppm, more preferably from about 1000 ppm to about 1500 ppm, has been found to be effective in enhancing the antimicrobial potency of the preservative.

Suitable food grade water soluble polyphosphates for use in dilute juice beverages of the resent invention typically have the following general formula:

$$(MPO_3)_n$$

where n averages from about 3 to about 100 and each M is independently selected from sodium and potassium atoms, i.e., are alkali metal salts of the polyphosphates. Preferably, n averages from about 13 to about 30 and each M is a sodium atom. Especially preferred are straight chain sodium polyphosphates (i.e., each M is a sodium atom) where n averages from about 13 to about 21, e.g., sodium hexametaphosphate.

The selected preservatives and polyphosphates act synergistically, or at least additively, to inhibit microbiological growth in the beverages of the present invention. This combination is particularly effective in inhibiting yeast, including preservative resistant *Zygosaccharomyces bailii*, and acid tolerant preservative resistant bacteria. Even within the juice concentrations specified for beverages of the present invention (i.e., about 0.1 to about 40%), ambient display times will increase with decreased percentages of juice in the beverage, such that low juice concentrations correlate with ambient display times exceeding about 20 days, while higher juice concentrations tend to correlate with ambient display times of between about 10 and 20 days. Variations in the concentration of preservatives and polyphosphates within the ranges described herein can also impact ambient display times. Nonetheless, so long as the concentration of juice, preservative, polyphosphate, and water hardness (and preferably water alkalinity) are within the ranges recited herein for the beverages, ambient display times will be at least about 10 days.

The dilute juice beverages of the present invention also preferably include water having a relatively low hardness, and preferably of controlled alkalinity. Specifically, the beverages of the present invention typically comprise from about 60 to about 99% additional water, more typically from about 80 to about 93% water. It is primarily the hardness of this water component that, when used in conjunction with the preservative system described above, provides the antimicrobial effect. The term "hardness" as used herein refers to the presence of calcium and magnesium cations in water, generally. See U.S. Pat. No. 5,431,740 (Calderas et al). issued Jul. 11, 1995 for how hardness is calculated according to the present invention, as well as methods for reducing hardness. For purposes of the present invention, added water does not include water incidentally included in the dilute juice beverage by other added materials such as, for example, the fruit juice component. This added water typically comprises from 0 to about 180 ppm, preferably from 0 ppm to about 60 ppm, and most preferably from 0 to about 30 ppm, of hardness.

In addition to hardness, controlling the alkalinity of the added water can provide some improvement in the antimicrobial benefit. The term "alkalinity" as used herein refers to the presence of carbonate and bicarbonate anions in water, generally. See U.S. Pat. No. 5,431,740 (Calderas et al). issued Jul. 11, 1995 for how alkalinity is calculated according to the present invention, as well as methods for reducing alkalinity. The added water preferably comprises from 0 to about 300 ppm, more preferably from 0 ppm to about 60 ppm, of alkalinity.

The beverages of the present invention can comprise other optional beverage ingredients, including other preservatives (e.g., organic acids), colorants other than $\beta$-carotene, and so forth. These beverages can also be fortified with from 0 to about 200% of the U.S. Recommended Daily Allowance (RDA) of vitamins and minerals, provided that such vitamins and minerals do not substantially alter the desired properties of the beverage (e.g., ambient display times), and that such vitamins and minerals are chemically and physically compatible with the other essential components of beverage. Especially preferred are vitamin B1 (e.g., thiamin HCl) and vitamin C (i.e., ascorbic acid), although it is understood that other vitamins can be included.

Minerals that can be included in beverages of the present invention are zinc, iodine, and copper. Any soluble salt of these minerals suitable for inclusion edible products can be used, for example, zinc chloride, zinc sulfate, potassium iodide, and copper sulfate.

The dilute juice beverages of the present invention typically have a pH of from about 2 to about 4.5, preferably from about 2.7 to about 4.2. This pH range is typical for dilute juice beverages. Beverage acidity can be adjusted to and maintained within the requisite range by known and conventional methods, e.g., the use of food grade acid buffers. Typically, beverage acidity within the above recited ranges is a balance between maximum acidity for microbial inhibition and optimum acidity for the desired beverage flavor and sourness impression.

The dilute juice beverages of the present invention can be prepared by slight modification of conventional methods for formulating noncarbonated beverages. Methods for making dilute juice beverages, for example, are described in U.S. Pat. No. 4,737,375 (Nakel et al), issued Apr. 12, 1988, which is incorporated herein by reference. Methods for making beverage products applicable to dilute juice beverages are also described by Woodroof and Phillips, *Beverages: Carbonated & Noncarbonated*, AVI Publishing Co.(rev. ed. 1981); and by Thorner and Herzberg, *Non-alcoholic Food Service Beverage Handbook*, AVI Publishing Co. (2nd ed. 1978). Such conventional methods can include hot packing or aseptic packaging operations, although such operations are not necessary for achieving either beverage stability or extended ambient display times, as described above.

E. Test Methods

1. $\beta$-Carotene Stability $\beta$-carotene stability (as a percentage of $\beta$-carotene lost) is determined according to the present invention by measuring the absorbance values (at 452 nm) of samples of the beverage or food containing the $\beta$-carotene soon after preparation and after a given period of time (e.g., 3 or 4 weeks). The following method is specifically directed at determining the $\beta$-carotene stability of dilute juice beverages prepared according to the present invention that contain about 5% juice, sodium hexametaphosphate and potassium sorbate. However, the $\beta$-carotene stability of other beverages and foods can also be determined by appropriate modifications of this method.

A 0.5% aqueous solution of ascorbic acid is prepared, as well as 0.1% BHT extraction solvent prepared by mixing the BHT in equal volumes of petroleum and ethyl ether. A 5% orange pulp wash reference blank solution is prepared that also contains [1%] sodium hexametaphosphate (average chain length n of about 13) and 0.5% potassium sorbate as the preservative system.

One gram of the dilute juice beverage sample to be evaluated, 1 ml of the 0.5% ascorbic acid solution, 2 ml of ethanol, and 2 ml of the 0.1% BHT extraction solvent are added to a centrifuge tube, capped and then vortex mixed for one minute. The capped tube is then centrifuged for 3 to 4 minutes a 2500 rpm. The extracted ether (top) layer in the tube is transferred to a 10 ml volumetric flask. An additional 2 ml of the 0.1% BHT extraction solvent is added to the centrifuge tube, followed by vortex mixing, centrifugation and transfer of a second extracted ether layer to the volumetric flask as before. This step is repeated one more time to provide a third extracted ether layer that is also added to the volumetric flask. Finally, 2 ml of the 0.1% BHT extraction solvent is added to the centrifuge tube, followed by vortex mixing and centrifugation to provide a fourth extracted ether layer that is also transferred to the volumetric flask. The four collected ether extracts in the volumetric flask are then diluted with the 0.1% BHT extraction solvent to the mark and thoroughly mixed to provide a sample for measurement by spectrophotometry.

The absorbance at 452 $\eta$m for the extracted sample and the 5% orange pulp wash reference blank solution is measured in the spectrophotometer. The absorbance values for the sample ($A_{Sample}$) and the reference blank solution ($A_{Blank}$) are used to determine the amount of $\beta$-carotene in the sample (mg/100 g of sample) according to the following equation:

$$\beta\text{-carotene in sample}=[(A_{Sample}-A_{Blank})\times 1000]/(223\times\text{weight of sample})$$

The $\beta$-carotene stability (i.e., how much $\beta$-carotene is lost over time) of these dilute juice beverages can be calculated by referencing the amount of $\beta$-carotene present in the dilute juice beverage after a given period of time (e.g., 3 or 4 weeks) to the amount of $\beta$-carotene present in the dilute juice beverage soon after it is prepared. The $\beta$-carotene stability of these dilute juice beverages is typically evaluated at ambient temperatures (e.g., about 70° F., 21.1° C.) at about 70 foot-candles illumination, but can also can be evaluated at other temperatures such as 40° F. (4.4° C.) and 90° F. (32.2° C.), as well as other illumination conditions such as dark, low illumination, and high illumination. The $\beta$-carotene stability of these dilute juice beverages prepared according to the present invention can also be evaluated in a variety of containers including glass, high density polyethylene (HDPE), and polyethylene terephthalate (PET).

2. Ambient Display Times

Ambient display times correspond to the time period during which a noncarbonated beverage product at about 68° F. (20° C.) can effectively resist microbial proliferation following a 10 cfu/ml inoculation with beverage spoilage microorganisms. As used herein, "microbial proliferation" means a 100 fold increase or greater in the number of beverage spoilage microorganisms in a beverage after an initial contamination level of about 10 colony forming units per ml (cfu/ml).

Ambient display times for beverages can be determined by the following method. Beverages are inoculated with mixed groups of preservative resistant yeast containing at least four separate yeast isolates, including *Zygosaccharomyces bailii*, and with mixed groups of preservative resistant, acid tolerant bacteria, including Acetobacter species. All yeast and bacteria utilized in the inoculation are previously isolated from preserved fruit juice beverages. Inoculated beverage products are maintained at 68° F. (20° C.) for 21 days and aerobic plate cultures performed periodically. Aerobic plate counts of both yeast and bacteria populations are performed as described in the Compendium of Methods for the Microbiological Examinations of Foods, American Public Health Association, Washington, D.C. (edited by C. Vanderzant and D. F. Splittstoesser), which description is incorporated herein by reference. These plate counts are then used to identify the degree of microbial proliferation in the inoculated beverage.

EXAMPLES

The following includes specific embodiments of the dilute juice beverages, and processes for preparing them, according to the present invention:

Beverages 1 to 3

Emulsions are prepared from the following ingredient formulations:

TABLE 1

| Ingredient | Emulsion 1 | Emulsion 2 | Emulsion 3 |
| --- | --- | --- | --- |
| Distilled Water | 79.4% | 69.4% | 79.6% |
| Roche 10% CWS β-Carotene | 0.22% | 0.0% | 0.0% |
| Ascorbic Acid | 0.0022% | 0.0022% | 0.0022% |
| Octenyl Succinate Modified Starch | 7.1% | 7.1% | 7.1% |
| Citric Acid | 0.30% | 0.30% | 0.30% |
| Vegetable Oil | 11.7% | 11.7% | 11.7% |
| Citrus Oil | 0.93% | 0.93% | 0.93% |
| Potassium Sorbate | 0.36% | 0.36% | 0.36% |
| Distilled Water for β-Carotene | 0.0% | 10.0% | 0.0% |
| Roche 10% CWS β-Carotene | 0.0% | 0.22% | 0.0% |

The ingredients in Table 1 above are generally mixed together in the order indicated and homogenized in a manner that produces an emulsion having an average particle size less than 1 micron in diameter. However, in Emulsion 1, the β-carotene is fully dispersed in water before additional ingredients are added. In Emulsion 2, the β-carotene is dispersed separately in water (i.e., water for β-carotene), and then this dispersion of β-carotene is added to the remaining ingredients after homogenization.

Beverage concentrates are then prepared from the respective emulsions and the following ingredients:

TABLE 2

| Ingredient | Concentrate 1 | Concentrate 2 | Concentrate 3 |
| --- | --- | --- | --- |
| Distilled Water | 57.2% | 57.2% | 57.2% |
| Artificial colors | 0.04% | 0.04% | 0.04% |
| Vitamin B1 (thiamine HCl) | 0.002% | 0.002% | 0.002% |
| Citric Acid | 7.7% | 7.7% | 7.7% |
| Sodium Citrate | 1.4% | 1.4% | 1.4% |
| Fruit Juice Concentrate | 12.5% | 12.5% | 12.5% |
| Emulsions* | 21.0% | 21.0% | 21.0% |
| Natural Flavor | 0.2% | 0.2% | 0.2% |

*From Table 1 above

The ingredients in Table 2 above are mixed together in order indicated. Beverages are then prepared from the respective concentrates and the following ingredients:

TABLE 3

| Ingredient | Beverage 1 | Beverage 2 | Beverage 3 |
| --- | --- | --- | --- |
| Distilled Water | 79.2% | 79.2% | 79.2% |
| Roche 10% CWS β-Carotene | 0.0% | 0.0% | 0.004% |
| Ascorbic Acid | 0.036% | 0.036% | 0.036% |
| Sodium Hexametaphosphate (SHMP) | 0.1% | 0.1% | 0.1% |
| Thickener blend* | 0.11% | 0.11% | 0.11% |
| Sweetener (HFCS) | 12.7% | 12.7% | 12.7% |
| Potassium Sorbate | 0.02% | 0.02% | 0.02% |
| Concentrate** | 7.9% | 7.9% | 7.9% |

*Blend of propylene glycol alginate, xanthan, and guar gums
**From Table 2 above The ingredients in Table 3 above are generally mixed together as follows: The ascorbic acid is dissolved in water (about 18% of total). For Beverage 3, the β-carotene is first dissolved in water (about 18% of total), and the ascorbic acid is then added to this dispersion. The thickener blend is separately dissolved in water (about 34% of total). The dissolved thickener is added to the dissolved ascorbic acid (hereafter "beverage blend"). The SHMP is separately dissolved in water (about 18% of total), and added to the beverage blend. The sweetener is added to the beverage blend and dissolved. The potassium sorbate is separately dissolved in water (about 9% of total), and added to the beverage blend. The beverage concentrate is added to the beverage blend and thoroughly mixed.

The finished beverages are placed in 16 oz. high density polyethylene (HDPE) bottles and ed at 70° F. (21.1° C.) under 70 foot-candles illumination. The results are shown in Table 4 below:

TABLE 4

| | % β-Carotene loss | |
| --- | --- | --- |
| Beverage | 1 week | 4 weeks |
| 1 | 9.4 | 13.7 |
| 2 | 27.3 | 31.8 |
| 3 | 56.0 | 83.8 |

As can be seen in Table 4 above, Beverage 1 (β-carotene homogenized in emulsion) has remarkably greater β-carotene stability compared to Beverage 3 ( β-carotene added during beverage blending). Beverage 2 ( β-carotene added to emulsion after homogenization) had good β-carotene stability, but not as good as Beverage 1.

Beverages 4 to 6

Emulsions are prepared from the following ingredients:

TABLE 5

| Ingredient | Emulsion A | Emulsion B |
|---|---|---|
| Distilled Water | 81.6% | 81.9% |
| Roche 10% CWS β-Carotene | 0.30% | 0.0% |
| Ascorbic Acid | 0.041% | 0.041% |
| Octenyl Succinate Modified Starch | 10.1% | 10.1% |
| Citric Acid | 0.94% | 0.94% |
| Vegetable Oil | 6.7% | 6.7% |
| Citrus Oil | 0.93% | 0.93% |
| Potassium Sorbate | 0.24% | 0.24% |

The ingredients in Table 5 above are mixed together in the order indicated and homogenized in a manner that produces an emulsion having an average particle size less than 1 micron in diameter. For Emulsion A, the β-carotene is fully dispersed in water before additional ingredients are added.

Flavor premixes are then prepared from these emulsions and the following ingredients:

TABLE 6

| Ingredient | Premix 4 | Premix 5 | Premix 6 |
|---|---|---|---|
| Distilled Water A | 1.7% | 2.6% | 1.7% |
| Roche 10% CWS β-Carotene | 0.0% | 0.22% | 0.0% |
| Juice Concentrate A | 38.2% | 38.2% | 38.2% |
| Natural Flavor Oil | 0.4% | 0.4% | 0.4% |
| Juice Concentrate B | 28.2% | 28.2% | 28.2% |
| Natural Flavor | 1.5% | 1.5% | 1.5% |
| Citric Acid | 22.4% | 22.4% | 22.4% |
| Distilled Water B | 2.6% | 1.7% | 2.6% |
| Roche 10% CWS β-Carotene | 0.0% | 0.0% | 0.22% |
| Vitamin B1 (thiamine HCl) | 0.0072% | 0.0072% | 0.0072% |
| Artificial Colors | 0.24% | 0.24% | 0.24% |
| Potassium Sorbate | 0.05% | 0.05% | 0.05% |
| Distilled Water C | 4.6% | 4.4% | 4.4% |

The ingredients in Table 6 above are mixed together as follows:

Step 1: For Premixes 4 and 6, mix Distilled Water A with Juice Concentrate A and natural flavor oil, and then homogenize. For Premix 5, first thoroughly dissolve/mix the β-carotene in Distilled Water A, add Juice Concentrate A, and natural flavor oil, and then homogenize;

Step 2: Add Juice Concentrate B and natural flavor, and then mix;

Step 3: Add citric acid and then mix;

Step 4: For Premixes 4 and 5, separately mix/dissolve Distilled Water B, thiamine HCl, colors and potassium sorbate, and then add this to mixture from Step 3. For Premix 6, first thoroughly dissolve/mix the β-carotene in Distilled Water B, then add thiamine HCl, colors, and sorbate, and then add this to mixture from Step 3.

Step 5: Add remaining Distilled Water C and then mix.

Beverage concentrates are then prepared from these emulsions, premixes, and the following ingredients:

TABLE 7

| Ingredient | Concentrate 4 | Concentrate 5 | Concentrate 6 |
|---|---|---|---|
| Distilled Water D | 21.1% | 21.1% | 21.1% |
| Sodium Hexametaphosphate (SRMP) | 0.67% | 0.67% | 0.67% |
| Potassium Sorbate | 0.07% | 0.07% | 0.07% |
| Thickener blend* | 0.34% | 0.34% | 0.34% |
| Distilled Water E | 5.3% | 5.3% | 5.3% |
| Citric Acid | 0.48% | 0.48% | 0.48% |
| Ascorbic Acid | 0.1% | 0.1% | 0.1% |
| Sweetener (HFCS) | 61.3% | 61.3% | 61.3% |
| Potassium Sorbate | 0.02% | 0.02% | 0.02% |
| Flavor Premix** | 6.1% | 6.1% | 6.1% |
| Emulsion*** | 4.5% | 4.5% | 4.5% |

*Blend of carboxymethylcellulose, xanthan, and sucrose
**From Table 6 above
***For Concentrate 4, Emulsion a is used; for Concentrates 5 and 6, Emulsion B is used.

The beverage concentrates are made by mixing together the ingredients in Table 7 above as follows:

Step 1: Thoroughly mix Distilled Water D, SHMP, and potassium sorbate;

Step 2: Thoroughly mix the thickener blend with the mixture from Step 1;

Step 3: Thoroughly mix Distilled Water E, citric acid, and ascorbic acid.

Step 4: To make each beverage concentrate, blend, in order, the mixture from Step 2, HFCS, the mixture from step 3 and the respective Flavor Premix. For Concentrate 4, blend in Emulsion A. For Concentrates 5 and 6, blend in Emulsion B.

Beverages 4 to 6 are prepared by blending distilled water (77.1%) with the respective beverage concentrate (22.9%). The finished beverages are placed in 20 oz. PET bottles and aged at 70° F. (21.1° C.) under 85 foot-candles illumination. The results are shown in Table 8 below:

TABLE 8

| | % β-Carotene loss | |
|---|---|---|
| Beverage | 1 week | 3 weeks |
| 4 | 45.6 | 49.1 |
| 5 | 32.8 | 54.6 |
| 6 | 58.0 | 77.9 |

As can be seen in Table 8 above, Beverage 4 (β-carotene homogenized in emulsion) had much greater β-carotene stability compared to Beverage 6 (β-carotene added to flavor premix). Beverage 5 (β-carotene homogenized in flavor premix) also had good β-carotene stability.

Beverages 7 to 10

Emulsions are prepared from the following ingredients:

TABLE 9

| Ingredient | Emulsion C | Emulsion D | Emulsion E |
|---|---|---|---|
| Distilled Water | 77.8% | 77.6% | 77.6% |
| Roche 10% CWS β-Carotene | 0.0% | 0.21% | 0.0% |
| BASF Lucarotin 10% β-Carotene CWD S/O | 0.0% | 0.0% | 0.21% |
| Ascorbic Acid | 0.0022% | 0.0022% | 0.0022% |
| Octenyl Succinate Modified Starch | 9.8% | 9.8% | 9.8% |
| Citric Acid | 0.30% | 0.30% | 0.30% |
| Vegetable Oil | 10.8% | 10.8% | 10.8% |

TABLE 9-continued

| Ingredient | Emulsion C | Emulsion D | Emulsion E |
|---|---|---|---|
| Citrus Oil | 0.86% | 0.86% | 0.86% |
| Potassium Sorbate | 0.36% | 0.36% | 0.36% |

The ingredients in Table 9 above are mixed to-ether in the order indicated and homogenized in a manner that produces an emulsion having an average particle size less than I micron in diameter. For Emulsions D and E, the β-carotene is fully dispersed in water before additional ingredients are added.

Beverage concentrates are then prepared from these emulsions, and the following ingredients:

TABLE 10

| Ingredient | Concentrate 7 | Concentrate 8 | Concentrate 9 |
|---|---|---|---|
| Distilled Water | 55.4% | 55.4% | 55.4% |
| Citric Acid | 7.7% | 7.7% | 7.7% |
| Sodium Citrate | 1.4% | 1.4% | 1.4% |
| Juice Concentrates | 0.34% | 0.34% | 0.34% |
| Distilled Water E | 12.5% | 12.5% | 12.5% |
| Citric Acid | 0.48% | 0.48% | 0.48% |
| Emulsion* | 22.8% | 22.8% | 22.8% |
| Natural Flavor | 0.2% | 0.2% | 0.2% |

*From Table 9 above

The beverage concentrates are made by mixing together the ingredients shown in Table 10 above in order indicated.

Beverages are then prepared from these beverage concentrates and the following ingredients:

TABLE 11

| Ingredient | Beverage 7 | Beverage 8 | Beverage 9 | Beverage 10 |
|---|---|---|---|---|
| Distilled Water | 79.1% | 79.1% | 79.1% | 79.1% |
| Roche 10% CWS β-Carotene | 0.004% | 0.0% | 0.0% | 0.0% |
| BASF Lucarotin 10% CWD β-Carotene S/O | 0.0% | 0.0% | 0.004% | 0.0% |
| Ascorbic Acid | 0.036% | 0.036% | 0.036% | 0.036% |
| Sodium Hexametaphosphate (SHMP) | 0.1% | 0.1% | 0.1% | 0.1% |
| Thickener blend* | 0.12% | 0.12% | 0.12% | 0.12% |
| Sweetener (HFCS) | 12.7% | 12.7% | 12.7% | 12.7% |
| Potassium Sorbate | 0.04% | 0.04% | 0.04% | 0.04% |
| Concentrate** | 7.9% | 7.9% | | 7.9% |

*Blend of carboxymethylcellulose, xanthan, and sucrose
**From Table 10 above

The beverages are prepared as follows: For Beverages 8 and 10, the ascorbic acid is dissolved in the distilled water (about 18% of total). For Beverages 7 and 9, the β-carotene is first dissolved in this distilled water, and then the ascorbic acid is added to this dispersion. The thickener blend is separately dissolved in the distilled water (about 34% of total) and then added to the dissolved ascorbic acid (and β-carotene, if present). The SHMP is separately dissolved in the distilled water (about 18% of total), and then added to the beverage blend. The HFCS is then added to the beverage blend and dissolved. The potassium sorbate is separately dissolved in the distilled water (about 9% of total), and added to the beverage blend. The beverage concentrate is then added to the beverage blend and thoroughly mixed.

The finished beverages are placed in 20 ml glass vials and aged at 70° F. (21.1° C.) under 85 foot-candles illumination.

The results are shown in Table 12 below:

TABLE 12

| Beverage | β-Carotene | % β-Carotene loss after 3 weeks |
|---|---|---|
| 7 | Roche | 86.7 |
| 8 | Roche | 29.1 |
| 9 | BASF | 66.1 |
| 10 | BASF | 15.0 |

As can be seen in Table 12 above, Beverages 8 and 10 (β-carotene homogenized in emulsion) had remarkably greater β-carotene stability compared to Beverages 7 and 9 (β-carotene added during beverage blending).

What is claimed is:

1. A method of forming a dilute juice beverage, the method comprising

1.) forming a dispersion by:
   a. providing a sufficient amount of water-dispersible beadlets, comprising at least about 5% colloidal carotenoid, wherein said carotenoid is (β-carotene, such that The dispersion will comprise from about 0.01 to about 0.5% β-carotene;
   b. releasing the carotenoid from the beadlets:
   c. intimately contacting, the released carotenoid with a sufficient oil phase, comprising a fat or oil clouding agent and a weighting oil agent, such that the dispersion will comprise from about 0.1 to about-25% of the fat or oil clouding agent and from 0 to about 205% of the weighting oil agent and the released carotenoid is stable against oxidation when in the presence of a water phase;
   d. combining a sufficient amount of emulsion stabilizer with the colloidal carotenoid, oil phase and water phase such that the dispersion will comprise from about 1 to about 30% of the emulsion stabilizer: and
   e. comprising a sufficient amount of water with the colloidal carotenoid, oil phase and emulsion stabilizer such that the dispersion will comprise from about 25 to about 97.9% water.

2.) combining:
   a. from about 0.2 to about 5% of said dispersion;
   b. from 0 to about 40% flavor solids selected from fruit juice, tea solids and mixtures thereof;
   c. from about 100 ppm to about 1000 ppm of a preservative selected from sorbic acid, benzoic acid, alkali metal salts thereof and mixtures thereof;
   d. an amount of a water soluble polyphosphate effective to enhance the antimicrobial potency of said preservative;
   e. the balance water.

2. The method of claim 1 wherein the amount of water soluble polyphosphate in the dilute juice beverage is from about 300 about 3000 ppm of the polyphosphate and wherein the polyphosphate has the following general formula:

$$(MPO_3)_n$$

wherein n averages from about 3 to about 100 and wherein each M is independently selected from sodium and potassium atoms.

3. The method of claim 2,
   a.) wherein the amount of water soluble polyphosphate in the dilute juice beverage from about 900 ppm to about 3000 ppm and wherein the amount of water soluble polyphosphate is sodium polyphosphate having the following general formula:

$$(NaPO_3)_n$$

wherein n averages from about from about 13 to about 21 and, b.) wherein the dilute juice beverage comprises from about 200 ppm to about 1000 ppm preservative and wherein said preservative is potassium sorbate.

4. The method to claim 2 wherein the dilute juice beverage comprises from about 1 to about 20% flavor solids, and wherein said flavor solids are fruit juice or mixtures of fruit juices.

5. The method of claim 4 wherein the dilute juice beverage comprises from about 2 to about 10% flavor solids, and wherein said flavor solids are fruit juice or mixtures of fruit juices.

6. The method of claim 1 wherein the dilute juice beverage comprises from about 0.8 to about 2% of said dispersion.

7. A method for forming an oil-in-water dispersion having dispersed therein a carotenoid that is stable against oxidation, even in the absence of an effective antioxidant, which comprises the steps of:

a. providing water-dispersible beadlets comprising at least about 5% colloidal carotenoid;
   b. releasing the carotenoid from the beadlets;
   c. intimately contacting the released carotenoid with sufficient oil phase such that the released carotenoid is stable against oxidation when in the presence of the water phase.

8. The method of claim 7 wherein the beadlets comprise from about 5 to about 20% carotenoid.

9. The method of claim 8 wherein the beadlets comprise from about 8 to about 15%, carotene.

10. The method of claim 9 wherein the ratio of oil phase to β-carotene is at least about 10:1.

11. The method of claim 10 wherein the ratio of oil phase to (β-carotene is at least about 500:1.

12. The method of claim 8 wherein the step of forming the dispersion comprises combining:

(a) from about 0.1 to about 25% of a fat or oil clouding agent;
   (b) from 0 to about 20% of a weighting oil agent;
   (c) from about 1 to about 30% of an emulsion stabilizer;
   (d) from about 0.01 to about 0.5% β-carotene;
   (e) from about 25 to about 97.9% water.

13. The method of claim 12 wherein the step of forming the dispersion comprises combining:

(a) from about 5 to about 15% of the fat or oil clouding agent;
   (b) from about 2 to about 20% of the emulsion stabilizer;
   (c) from about 0.02 to about 0.1% β-carotene;
   (d) from about 60 to about 80% water.

14. The method of claim 13 wherein the emulsion stabilizer is a modified food starch and wherein the ratio of the emulsion stabilizer to oil phase is in the range from about 0.1:1 to about 5:1.

15. The method of claim 14 wherein the ratio of the emulsion stabilizer to oil phase is in the range from about 0.6:1 to about 1.5:1.

16. A method for forming an oil-in-water emulsion having dispersed therein a β-carotene that is stable against oxidation, even in the absence of an effective antioxidant, which comprises the steps of:

a. contacting water-dispersible beadlets comprising at least about 5% colloidal β-carotene with sufficient water phase to form droplets of the β-carotene;
   b. intimately contacting the β-carotene droplets with sufficient oil phase such that the β-carotene is stable against oxidation.

17. The method of claim 16 wherein the beadlets comprise from about 8 to about 15% β-carotene.

18. The method of claim 16 wherein the ratio of oil phase to β-carotene is at least about 500:1.

* * * * *